United States Patent [19]

Waddington

[11] Patent Number: 4,771,442
[45] Date of Patent: Sep. 13, 1988

[54] ELECTRICAL APPARATUS

[75] Inventor: Damer E. O. Waddington, Hertfordshire, United Kingdom

[73] Assignee: Marconi Instruments Limited, Chelmsford, England

[21] Appl. No.: 54,762

[22] Filed: May 27, 1987

[30] Foreign Application Priority Data

May 28, 1986 [GB] United Kingdom ............... 8612905

[51] Int. Cl.[4] ............................................ H04L 7/02
[52] U.S. Cl. ................................. 375/110; 331/25; 370/110.1
[58] Field of Search ............. 375/106, 118, 120, 110; 371/6; 328/155; 331/25; 370/110.1

[56] References Cited

U.S. PATENT DOCUMENTS 3,982,194  9/1976  Chi et al. ........................ 328/155
4,365,210 12/1982  Harrington et al. ............ 375/120 X
4,488,294 12/1984  Christensen et al. ........ 370/110.1 X Primary Examiner—Philip H. Leung
Assistant Examiner—Derek S. Jennings
Attorney, Agent, or Firm—Lowe, Price, LeBlanc, Becker & Shur

[57] ABSTRACT

Apparatus for use in extracting clock signals from a digital data stream that periodically generates an enable window of chosen duration at periods when a data edge is expected in the stream as disclosed. If a data edge is received during a window, the apparatus of this invention resets and restarts a clock pulse generator operating at the nominal frequency of the clock to be extracted. The extracted clock remains in synchronism with that of the data and is unaffected by noise spikes occuring outside the window area. If a chosen period of time elapses without any data edges received then the apparatus of this invention increases the window period so as to allow for jitter in the clock rate.

11 Claims, 2 Drawing Sheets

ELECTRICAL APPARATUS

BACKGROUND OF THE INVENTION

This invention relates to electrical apparatus, particularly to apparatus adapted for use as a clock extraction system.

When making measurements on data streams, e.g., bit error rate, it is necessary to extract the clock signal from the data in order to provide timing for the decoding circuits. Systems used for this purpose need to allow for both jitter on the received signal and also to ignore any noise which may be present. There is of course in general no regular clock pulse received with the data signal and the clock must be extracted by detecting edges on the received data.

Methods currently available for clock extraction use either tuned circuits, injection locked oscillators or resettable counters or oscillators. All of these systems are to some extent subject to perturbation by noise. Furthermore, tuned circuits and injection locked oscillators are designed for use with data rates at one particular frequency and are unsuitable for multifrequency systems. The present invention proposes a method of clock extraction, useful over a range of frequencies, in which the effects of interfering signals are reduced to a minimum and noise spikes are masked so that their interference with the data stream is substantially reduced.

SUMMARY OF THE INVENTION

According to the present invention there is provided electrical apparatus for extracting clock signals from a digital data stream, comprising: a clock pulse generator; input means for a digital data stream; window generating means for periodically generating enable windows of a chosen duration at periods when a data edge is expected to occur within the period; means for resetting and restarting the clock pulse generator upon receiving a data edge during an enable window; and means for extracting the generated clock pulses.

The apparatus may further include means for detecting if a preset number of enable windows have been generated with no data edges received during the enable periods and, if so, for increasing the duration of the enable window periods, the detecting means being reset when a data edge is received during an enable period. The detecting means may include a counter.

Preferably, the window generation means are controlled by a signal derived from the clock pulse generating means and further logic circuitry. The clock pulse generator may include an oscillator and one or more programmable dividers.

The apparatus according to the invention may be used for extracting clock signals from a digital data stream, to provide timing for signal decoding circuits for example. The extracted clock signal varies with the clock rate of the data stream and is less affected by noise than previous systems.

The apparatus may also be used for making measurements on data which has an accompanying clock. In this case, the internal clock signals generated by the apparatus may be synchronised with the external clock accompanying the data and will retain lock despite variations in the external clock frequency. The internal clock may also be synchronised to a sub-multiple or multiple of the external clock frequency.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
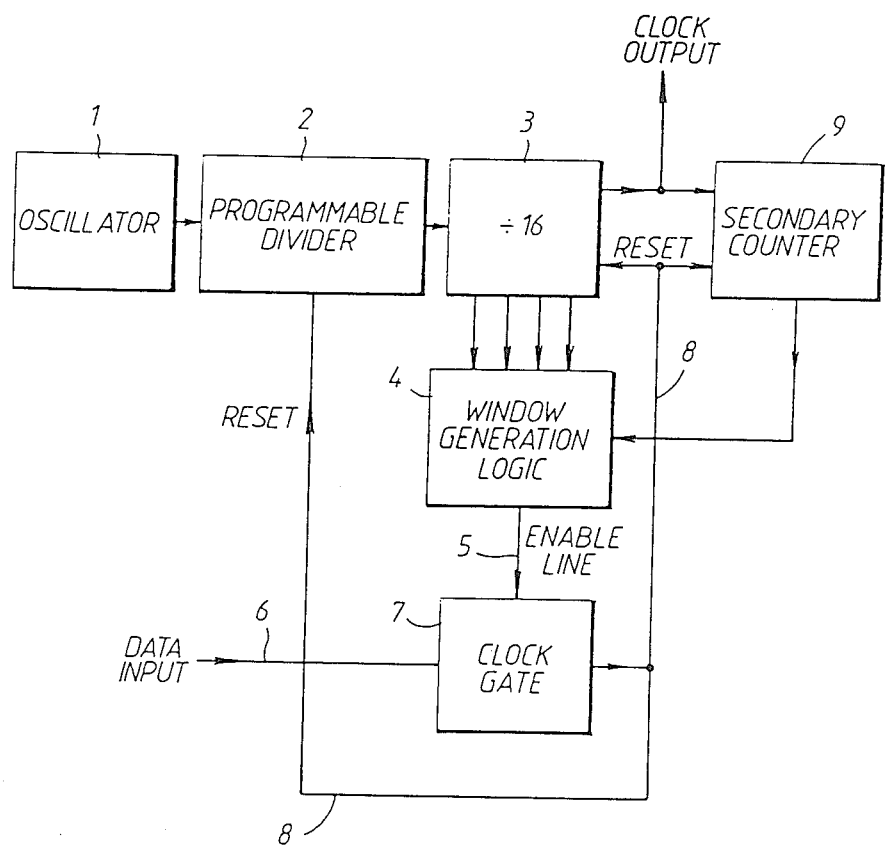
FIG. 1 shows apparatus according to the invention for extracting clock signals.

Referring to FIG. 1, the apparatus includes an oscillator 1 which is preferably set to provide a clock signal of approximately 16 times the lowest common multiple of all the expected nominal data rates. The clock signal generated by oscillator 1 is fed to a programmable divider 2 and subsequently to a further divider 3. The output from divider 3 is fed to logic circuits 4 which are arranged to produce a variable output on an enable line 5 as will be described below. The data input 6 to the apparatus is fed to a clock gate 7. When enabled by the logic 4 via line 5, the clock gate 7 passes any data edges present from input 6 to reset dividers 2 and 3 on reset lines 8.

A secondary counter 9 is used to count clock periods without any incoming signals in order to provide control signals to the logic 4, as will also be further described below.

The use of the apparatus to extract clock signals from an incoming data stream is as follows: an internal clock frequency is set up by oscillator 1 and is arranged to be 16 times the lowest common multiple of all the expected data rates with which the apparatus will be used. An appropriate frequency for all the commonly used data rates is 18432 kHz. The output from oscillator 1 is fed to programmable divider 2 which is set to the division ratio required to produce 16 times the clock rate of the data input. I.e, if the clock frequency of the input data is 64 kHz, then the output from programmable divider 2 will be at 1024 kHz. This signal is shown in the top line of FIG. 2. The output from divider 2 is fed to divider 3 and to the window logic circuits 4. These circuits determine which of the four outputs, A, B, C or D as shown in FIG. 2 are present on the enable line 5 at any time.

Figure 2:
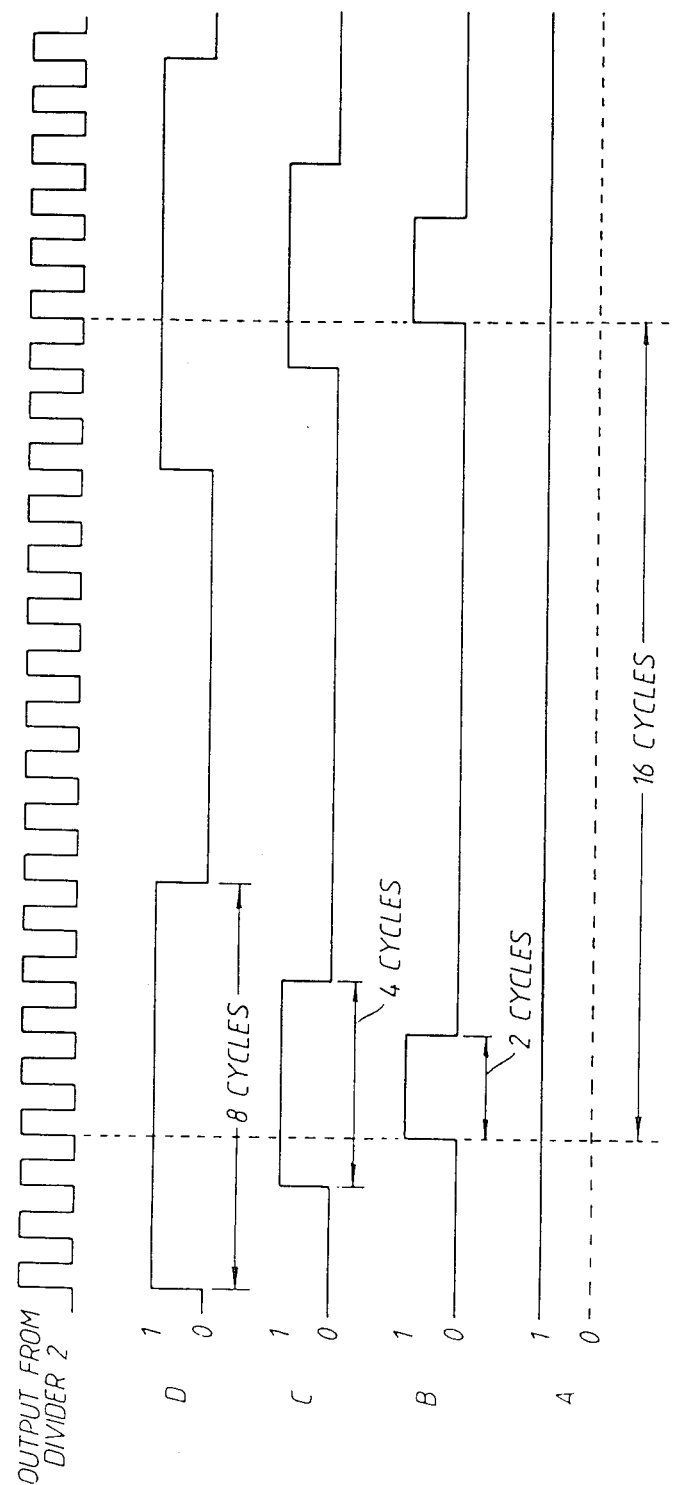
FIG. 2 shows possible signals which may be present on the enable line of the apparatus of FIG. 1.

Initially the enable line is in state A of FIG. 2. This enables any data present on input 6 to be fed to the reset line 8. The data input 6 is fed into the clock gate 7 and the first negative going data edge received is passed through to reset lines 8. This resets both dividers 2 and 3 to zero and enables window B. As is shown in FIG. 2, window B enables the clock gate every 16 cycles of the internal clock for a period of 2 cycles. It is therefore enabled only at times at which negative going data edges are expected, with some latitude allowing for jitter in the time of arrival. Hence any edges which occur in the intervening period are prevented from reaching the reset line. Data edges that do arrive within the enable period are fed to the reset line, reset the counters and enable window B from the start of its cycle again. Thus a clock output from divider 3 is achieved which is in synchronism with the clock signal from the data. Any noise signals occuring outside the enable periods are of course ignored by the apparatus and hence the extracted clock is closely in phase with the data.

If there are no data transitions for a period and jitter is present on the data, there is a possibility that the next transition could occur outside the window area B and hence the extracted clock could lose synchronisation with the clock frequency of the received data. To allow for this the number of clock periods without a data transition is counted by the secondary counter 9, where one period is the time between the start of the enable periods of window B, i.e, sixteen pulses from divider 2. After a preset number of periods without a data transition has been reached, the enable window C is selected which provides a larger enable window each period and hence allows for a greater degree of jitter in the received data. Typically, secondary counter 9 may be arranged to count 8 periods before sending appropriate signals to the logic to enable window C. If data transitions are still not received after a further preset count then enable window D is selected which again provides a larger window area and hence allows for a greater degree of jitter. If data transitions are still not received after a further count by secondary counter 9, then the window function is removed entirely, the clock extraction circuit is set to the initial state A and the cycle is repeated. The first data edge subsequently received serves to reset the extracted clock and to enable window B. Each time a data transition occurs during the enable window area of windows B, C or D, the dividers are reset and window B selected. This, as described above, ensures that the extracted clock signal remains in synchronism with the clock signal from the data to within the limits imposed by window B, and alters as the clock signal from the data alters with jitter or other reasons. The clock signal is also significantly less affected by noise signals since these are most likely to occur outside the window areas where they will be ignored.

The chosen number of counts by secondary counter 9 before a different window is selected may be any convenient number and may vary between states A, B, C and D. They may be chosen by programming the secondary counter in known manner.

Since the extracted clock signals are in synchronism with the clock frequency of the incoming data, the same circuit may be used for making measurements on data which has an accompanying clock. In this case, the data input shown in FIG. 1 is replaced by an input from the external clock. It follows from the above description that the internal frequency of the clock extraction circuit can then be synchronised to the external clock. By utilising the dividers 2 and 3 the internal clock may be synchronised to a submultiple of the external clock frequency or to a multiple of the clock frequency and may be synchronised to a frequency of up to 15 times the external clock frequency. For sychronising to a submultiple of the external frequency it may be desirable to change the window selection times B, C, and D. It is seen that as the input frequency varies so does the internal frequency of the apparatus which therefore retains lock with the external clock. With the window times shown, the input frequency may vary by up to 12% either way and lock will still be retained.

I claim:

1. Electrical apparatus for extracting clock signals from a digital data stream comprising: a clock pulse generator; window generating means for periodically generating enable windows of a chosen duration at periods when a data edge is expected to occur within the period; means for resetting and restarting the clock pulse generator upon receiving a data edge during an enable window; input means coupled to said means for resetting and restarting for receiving a digital data stream and means for extracting the generated clock pulses.

2. Apparatus as claimed in claim 1 further including means for detecting if a preset number of enable windows have been generated with no data edges received and, if so, for increasing the duration of the enable window periods.

3. Apparatus as claimed in claim 2, wherein the window generating means and detecting means are resettable and adapted to be reset when a data edge is received during an enable window.

4. Apparatus as claimed in claim 2, wherein the detecting means includes a resettable counter and logic circuitry.

5. Apparatus as claimed in claim 2 adapted such that the duration of the enable window periods is progressively increased each time a chosen number of enable window periods occurs without receiving any data edges.

6. Apparatus as claimed in claim 5 adapted such that when the enable window period has reached a chosen maximum length, if a further chosen number of periods elapses without receiving any data edges, then the window function is removed and the first data edge subsequently received resets the clock pulse generator and resets the window function such that the period of each enable window is of its minimum duration.

7. Apparatus as claimed in claim 2 including means for initiating the clock pulse generator and window generation cycles at the receipt of a first data edge in the digital data stream.

8. Apparatus as claimed in claim 2 wherein the clock pulse generator includes an oscillator and one or more programmable dividers.

9. Apparatus as claimed in claim 2 wherein the window generation means are controlled by a signal derived from the clock pulse generating means.

10. Apparatus as claimed in claim 2 wherein the digital data stream is an external clock.

11. Apparatus as claimed in claim 10 wherein the generated clock pulses are in synchronism with a multiple or sub-multiple of the frequency of the external clock.

* * * * *